United States Patent
Ball

(10) Patent No.: US 12,480,579 B2
(45) Date of Patent: Nov. 25, 2025

(54) PREDICTIVE FAILURE SYSTEM, APPARATUS AND METHOD FOR HYDROSTATIC TRANSMISSIONS

(71) Applicant: 2541980 ALBERTA LTD., Calgary (CA)

(72) Inventor: Mike Ball, Kelowna (CA)

(73) Assignee: 2541980 Alberta LTD., Kelowna (CA)

( * ) Notice: Subject to any disclaimer, the term of this patent is extended or adjusted under 35 U.S.C. 154(b) by 0 days.

(21) Appl. No.: 18/816,603

(22) Filed: Aug. 27, 2024

(65) Prior Publication Data

US 2025/0075791 A1 Mar. 6, 2025

Related U.S. Application Data

(60) Provisional application No. 63/579,090, filed on Aug. 28, 2023.

(51) Int. Cl.
| | |
|---|---|
| *F16H 61/00* | (2006.01) |
| *B60W 50/00* | (2006.01) |
| *B60W 50/14* | (2020.01) |
| *F16H 61/4192* | (2010.01) |
| *G06N 3/00* | (2023.01) |
| *G06N 3/02* | (2006.01) |

(52) U.S. Cl.
CPC ......... *F16H 61/4192* (2013.01); *B60W 50/14* (2013.01); *G06N 3/02* (2013.01)

(58) Field of Classification Search
CPC ....... F16H 61/4192; B60W 50/14; G06N 3/02
USPC .......................................................... 701/62
See application file for complete search history.

(56) References Cited

U.S. PATENT DOCUMENTS

2008/0065290 A1* 3/2008 Breed ............... G01L 17/00
701/31.4

FOREIGN PATENT DOCUMENTS

CN 116663419 A * 8/2023

OTHER PUBLICATIONS

Pape Machinery, "Choosing a Transmission: Hydrostatic vs. Manual," Apr. 17, 2019, John Deere, Blog, whole document. (Year: 2019).*
Eaton, "Troubleshooting Guide for Eaton Hydrostatic Transmissions used on Concrete Mixers," Jul. 1995, Eaton Heavy Duty Transmissions, whole document. (Year: 1995).*
Will Nelson, "Tractor Transmissions: Shuttle Shift, Hydrostatic, and Gear Drive," Apr. 25, 2023, Nelson Tractor Company, INC, Blog, whole document. (Year: 2023).*

* cited by examiner

*Primary Examiner* — Tiffany P Young
(74) *Attorney, Agent, or Firm* — Thibault Patent Group

(57) ABSTRACT

A system, apparatus and method providing a predictive maintenance system for a vehicle comprising a hydrostatic transmission. Sensors are installed on a vehicle to monitor various operating characteristics of a hydrostatic transmission. The sensors generate raw sensor data that is received by an onboard edge processing unit that applies the signals to a neural network model to derive predictions of potential future mechanical failures of the hydrostatic transmission. The inferences and raw sensor data may be sent to a remote data center via a personal communication device associated with the vehicle, to further train the neural network model.

18 Claims, 9 Drawing Sheets

PREDICTIVE FAILURE SYSTEM, APPARATUS AND METHOD FOR HYDROSTATIC TRANSMISSIONS

BACKGROUND

I. CROSS-REFERENCE TO RELATED APPLICATIONS

This application claims the benefit of U.S. provisional patent application 63/579,090 filed on Aug. 28, 2023, the entire contents of which is incorporated herein.

II. FIELD OF USE

The present invention relates to the field of complex mechanical machinery and more specifically to a system, method and apparatus for proactively monitoring hydrostatic transmissions of commercial vehicles to detect early signs of failure.

III. DESCRIPTION OF THE RELATED ART

Hydrostatic drives, or transmissions, are complex hydraulic pump-motor combinations used extensively in the agricultural industry in particular. They are particularly suited for almost any type of equipment less than 100 HP, due to their ability to drive one or more hydraulic motors at variable speeds in either direction. This includes small frame tractors, high-clearance sprayers and combines, to name a few.

While hydrostatic systems are highly effective, component failures can have disastrous consequences. As hydrostatic drives age, they may introduce tiny contaminants into the system, which may be circulated throughout the system via hydraulic fluid, potentially damaging every component in a drive train.

In order to maintain such hydrostatic transmissions in good working order, routine maintenance may be recommended by a manufacturer, such as periodic oil changes, manual inspections, filter replacement, etc. However, even adhering to such maintenance recommendations, failures are inevitable over time.

Since most hydrostatic failures must be serviced by an OEM service center, repairs tend to be expensive. Moreover, repairing damaged transmissions may also result in significant downtime. For example, high-clearance agricultural sprayers are a vital machines used by farmers that are typically the first tractor in the field in the spring, and the last tractor out of the field in the fall. Most farming operations may have 1-2 such pieces of equipment, so any downtime may result in significant crop damage or even failure. The financial impact of a crop failure may be substantially more than the repair costs alone.

It would be desirable to be able to monitor such hydrostatic transmissions in order to predict how and when a major failure may occur.

SUMMARY

The embodiments herein describe systems, methods and apparatus for predicting mechanical failures of hydrostatic transmissions. In one embodiment, a predictive maintenance system is described, comprising a plurality of sensors installed onto one or more areas of the hydrostatic transmission, configured to generate raw sensor data representative of a plurality of sensed mechanical conditions of the hydrostatic transmission, respectively, and an edge processing unit coupled to the plurality of sensors and comprising a communication interface for transmitting information to a person communication device, configured to receive the raw sensor data from the plurality of sensors, process the raw sensor data using a neural network model specifically trained to predict future potential mechanical failures of the hydrostatic transmission, generate an inference based on the raw sensor data, and transmit an alert via the communication interface when the inference indicates that a future potential mechanical failure of the hydrostatic transmission may occur.

In another embodiment, a method is described for predicting mechanical failures of hydrostatic transmissions, comprising training a neural network model to detect anomalies in one or more physical operating characteristics of the hydrostatic transmission loading the trained neural network model onto an edge processing unit co-located with the vehicle, receiving, by the edge processing unit, raw sensor data from a plurality of sensors mounted to the hydrostatic drive, determining an inference by the neural network model based on evaluating the raw sensor data, wherein the inference indicates a potential future mechanical failure of the hydrostatic transmission; and sending, by the edge computing device, an alert of the inference to a personal communication device associated with the vehicle.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Various embodiments of a system, method and apparatus for predicting mechanical failures of hydrostatic drive equipment, i.e., hydrostatic transmissions, are described. An edge processing unit is installed onto a vehicle comprising a hydrostatic transmission along with a variety of sensors. The edge processing unit processes signals from the sensors using a neural network model to identify potential failures of the transmission before they become catastrophic, reducing repair costs and minimizing downtime.

Figure 1:
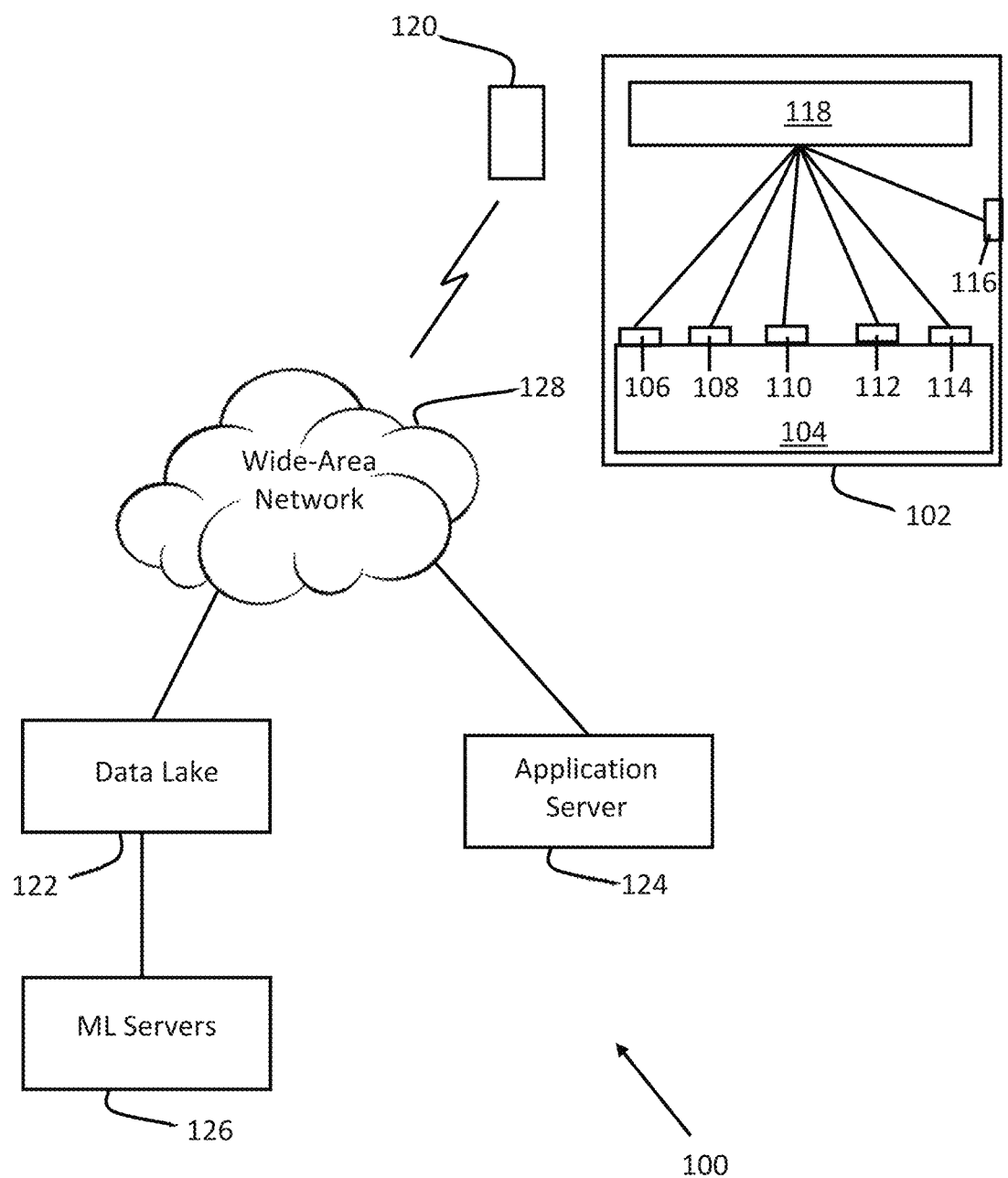
FIG. 1 is a functional block diagram illustrating one embodiment of a predictive maintenance system 100 to predict mechanical failures of a hydrostatic transmission.

FIG. 1 is a functional block diagram illustrating one embodiment of a predictive maintenance system 100 for a hydrostatic transmission 104 of vehicle 102. Hydrostatic transmission 104 is monitored by a plurality of sensors, in this example, a first vibration sensor 106, a second vibration sensor 108, a chip detector 110, an oil pressure sensor 112 and an oil condition monitoring sensor 114. Each one of these sensors are installed onto various portions of hydrostatic transmission 104, as will be explained later herein. One or more vehicle sensors 116, such as a torque sensor, temperature sensor, engine oil pressure, engine oil temperature, etc. may monitor characteristics of vehicle 102 during operation of vehicle 102. It should be understood that the number and type of sensors shown in FIG. 1 are for illustrative purposes only, and that in other embodiments, a greater, or fewer, number of sensors may be used, and/or different types of sensors as well.

Each of the sensors is coupled to an edge processing unit 118, typically located on vehicle 102. Edge processing unit 118 monitors signals sent from the sensors to predict potential future failures of hydrostatic transmission 104 using machine learning techniques. Edge processing unit 118 executes a trained neural network model to detect anomalies in the sensor data.

Personal communication device 120 is used to communicate with edge processing unit 118, typically via a local, wireless communication link, such as Wi-Fi or Bluetooth, to display real-time alerts and contextual information when a fault condition is detected (e.g. "low outlet pressure detected on main pump"). Such alerts and contextual information may be processed by a software application or "app" running on personal communication device 120. The app may be further configured to wirelessly receive inferences (i.e., predictions) and associated metadata, raw sensor data and associated metadata, maintenance suggestions, etc. from edge processing unit 118 and transmit it to a remote data processing center, such as data lake 122 and/or application server 124 via wide-area network 128 Further still, the app may be configured to configure edge processing unit 118 based on the make and model of vehicle 102, the make and model of hydrostatic drive 104, and the number and types of sensors that monitor hydrostatic drive 104 and/or vehicle sensors 116. Personal communication device 120 may comprise a smart phone, smart watch, laptop computer, tablet computer, or any other portable electronic device capable of communicating with edge processing unit 118 and data lake 122 and/or application server 124 via wide-area network 128.

In one embodiment, edge processing unit 118 uses personal communication device 120 as a long-range communication surrogate. In other embodiments, edge processing unit 118 may be configured to communicate with remote entities via wide-area network 128 without having to use personal communication device to relay information.

The neural network model running on edge processing unit 118 is the result of training previous versions of the neural network model by one or more machine learning servers 126. Machine learning server(s) 126 use training data obtained from either failure simulations and/or from raw sensor data and related metadata provided by vehicle 102 and other vehicles via wide-area network 128, to refine the neural network model to best predict future mechanical failures of hydrostatic drives and, in some embodiments, to recommend preventative maintenance. Training data is typically stored by data lake 122 which serves as a centralized repository that stores, processes, and secures large amounts of data, typically in its original format, regardless of type or structure. Data lake 122 can typically store structured, semi-structured, and unstructured data, and it can typically process any variety of data without size limits. Data lake 122 may comprise an Amazon S3 object storage server and service. Machine learning server 126 may access the training data stored in data lake 122 as each iteration of training occurs. Such training techniques are well-known in the art.

Application server 124 may provide an app for execution by personal communication devices for communicating with respective edge processing units 118, providing an interface for presenting status, alerts, maintenance suggestions, predictions, raw sensor data, etc. to an operator of a vehicle 102. Application server 124 may comprise a web-based portal for managing fleets of vehicles, including storage of data associated with each vehicle in a fleet, such as neural network model IDs and versions thereof uploaded to each vehicle, raw data, and potentially longer-term trend analysis. In one embodiment, application server 124 comprises a server provided by Amazon Web Services and hosting, for example, a React application using, for example, Keycloak for identity and access management.

Figure 2:
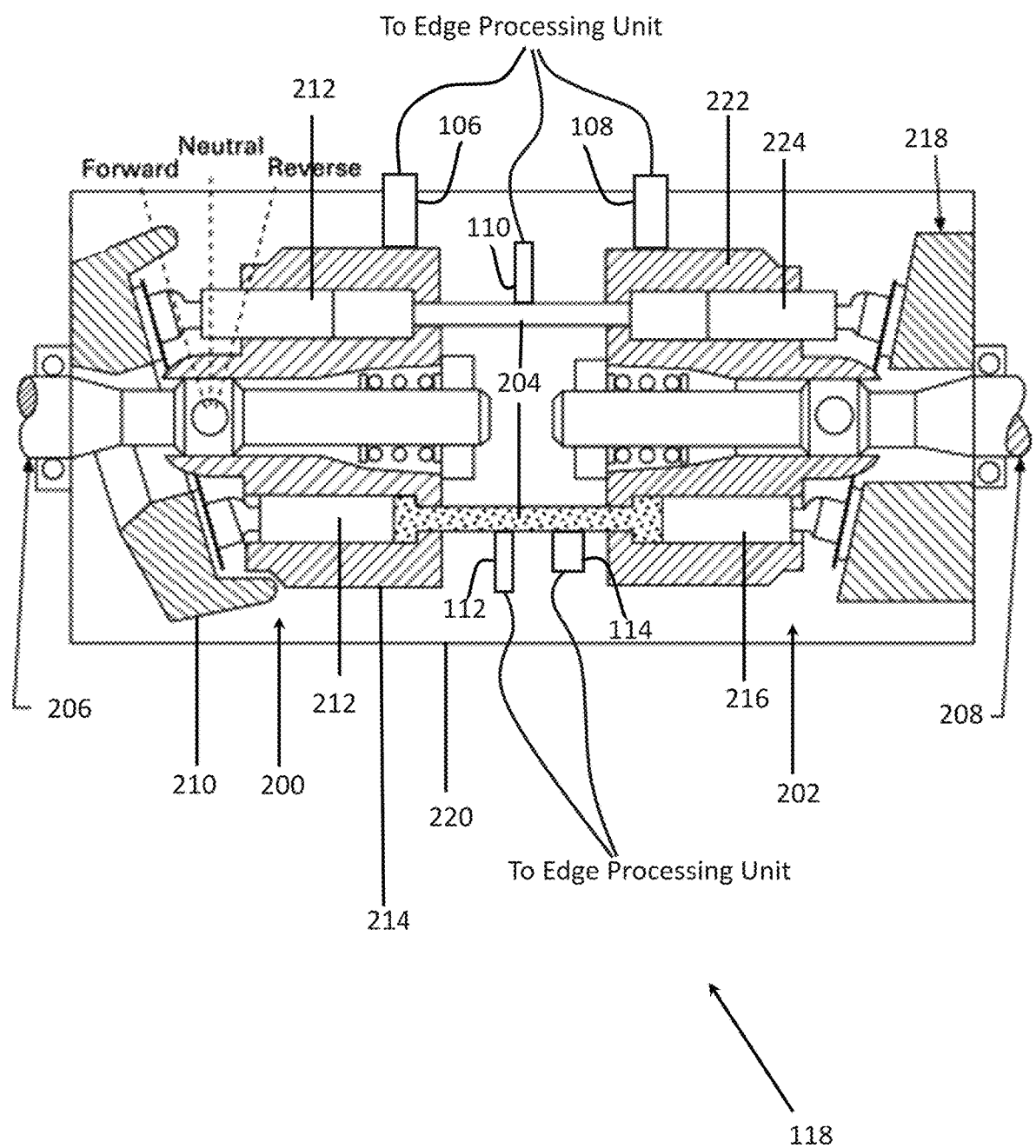
FIG. 2 is a side, cut-away view of one embodiment of a typical hydrostatic transmission, outfitted with a plurality of sensors in accordance with the inventive principles discussed herein.

FIG. 2 is a side, cut-away view of one embodiment of a typical hydrostatic transmission 104 of vehicle 102 outfitted with a plurality of sensors in accordance with the inventive principles discussed herein. Shown is a first vibration sensor 106, a second vibration sensor 108, a chip detector 110, an oil pressure sensor 112 and an oil condition monitoring sensor 114, with each sensor coupled electronically to edge processing unit 118.

Hydrostatic transmissions are used extensively in the construction and agriculture vehicles, such as backhoes, bulldozers, small frame tractors, high-clearance sprayers, combines, etc., due to their ability to drive one or more hydraulic motors of such vehicles at variable speeds in either direction. As shown in FIG. 2, hydrostatic transmission 104 comprises an axial piston pump 200 coupled to a hydraulic motor 202 via two hydraulic lines 204. In this embodiment, piston pump 200 and hydraulic motor 202 are co-located in a single case 220. However, in other embodiments, piston pump 200 and hydraulic motor 202 may be separate from one another and coupled together via the hydraulic lines 204.

Piston pump 200 converts mechanical energy from input shaft 206, driven by a gas or diesel engine of vehicle 102, into pressure, carried by the hydraulic lines 204 to hydraulic motor 202. Hydraulic motor 202 reconverts the pressure energy to mechanical energy that turns output shaft 208 which, in turn, typically drives one or more wheels of vehicle 102.

To control the speed and direction of hydraulic motor 202, a variable swashplate 210 is positioned at various angles by a valve or manual lever (not shown). Swashplate 210 acts on a plurality of internal pistons 212 of cylindrical block 214, which is coupled to input shaft 206. As input shaft 206 rotates, block 214 also rotates, and the pistons 212 are held in contact with swashplate 210 by springs (not shown), drawing hydraulic fluid, oil or the like, into pump 200 via one of the hydraulic lines 204 and forcing it out the other hydraulic line 204.

In FIG. 2, swashplate 210 is shown positioned at an angle that causes vehicle 102 to move forward at maximum speed.

In this position, lower piston 212 is compressed by swashplate 210 which pushes fluid out from pump 200 to hydraulic motor 202 via lower hydraulic line 204 (in reality, there are a plurality of pistons in block 214, not shown in this view). The fluid entering hydraulic motor 202 pushes a piston 216 located within block 222 against a fixed swashplate 218, causing block 222 and output shaft 208 to rotate. Fluid is also pushed out of hydraulic motor 202 via piston 224 and into upper hydraulic line 204, assisted by piston 212 as it retracts.

To drive hydraulic motor 202 in reverse, the swashplate is angled in the opposite direction. Fluid from pump 200 is then forced into hydraulic motor 202 via upper hydraulic line 204, while fluid returns via lower hydraulic line 024. Due to the angle of fixed swashplate 218, the rotation speed of hydraulic motor 202 is proportional to the pressure from pump 200.

FIG. 2 shows five sensors installed onto hydrostatic transmission 104, although in other embodiments, a greater, or fewer, number and type of sensors may be installed. Installation of sensors may occur at a manufacturing facility of hydrostatic transmission 104, upon installation into vehicle 102 or any time thereafter. The sensors are installed using well-known mechanical installation techniques, such as affixing certain sensors to a case 220 of hydrostatic transmission 104, installing "T" connectors into hydraulic lines and installing oil temperature, pressure, and/or condition sensors.

Vibration sensors 106 and 108 are typically leading indicators of bearing wear and loose tolerances, as well as damage caused by cavitation. Accelerometers for machine instrumentation are available from companies such as Amphenol and TE Connectivity. A single accelerometer on the case 220 of pump 200 is likely to be sufficient. Electrical signals from the vibration sensors is typically an analog voltage proportional to the observed acceleration. Generally, the vibration sensors are powered directly by the edge processing unit 118. Edge processing unit 118 may analyze the electrical signals from the vibration sensors, for example, using power spectral density analysis techniques in the frequency domain and/or amplitude determination techniques in the time domain.

Chip detector 110 measures the amount of magnetic particles accumulate in the hydraulic lines 204 over time due to wear of internal components of hydrostatic transmission 104. Chip detectors are available from a range of industrial sensing and aviation companies, including Meggitt Sensing and Allen Aircraft Products. Chip detector 110 may be installed in an oil line preceding an oil filer of hydrostatic transmission 104, teed into one of the hydraulic lines 204 or elsewhere As particles accumulate, the resistance between two sensing leads may decrease, which can be measured by edge processing unit 118 by detecting increased current or decreased voltage across the sensor leads.

Oil pressure sensor 112 comprises one of a number of available fluid pressure sensors widely available in a variety of pressure ranges and response times, in order to monitor the fluid pressure of hydrostatic transmission 104 (i.e., an oil pressure, a hydraulic fluid pressure, etc.). Kavlico is a manufacturer with solid track record and a broad product portfolio. Oil pressure sensor 112 is typically installed into one or more hydraulic lines 204 using a tee junction and physically mounted using clamp to an existing bolt of hydrostatic transmission model 104. In some embodiments, multiple oil pressure sensors 112 are used to monitor hydrostatic transmission 104, for example, one located at a fluid input of pump 200 (such as at the left end of upper hydraulic line 204) and another one located at a fluid outlet of pump 200 (such as the left end of lower hydraulic line 204). Other oil pressure sensors 112 may be desirable, depending on, for example, the number of motors 202 of hydrostatic transmission 104. Electrical output of oil pressure sensor 112 is typically an analog voltage proportional to the observed pressure, typically powered by edge processing unit 118.

Oil condition monitoring sensor 114 monitors the condition of the oil or hydraulic fluid of hydrostatic transmission 104, i.e., changes in a dielectric constant of the sensor so as to analyze the moisture content, wear particles, viscosity, water contamination, etc. in the fluid of hydrostatic transmission 104. Such sensors are widely available, for example, a OQS 2 oil quality sensor manufactured by Des-Case of Goodlettsville, Tennessee. The output of oil condition monitoring sensor 114 may comprise an electronic analog signal and/or a digital signal, and may be powered by edge processing unit 118.

Figure 3:
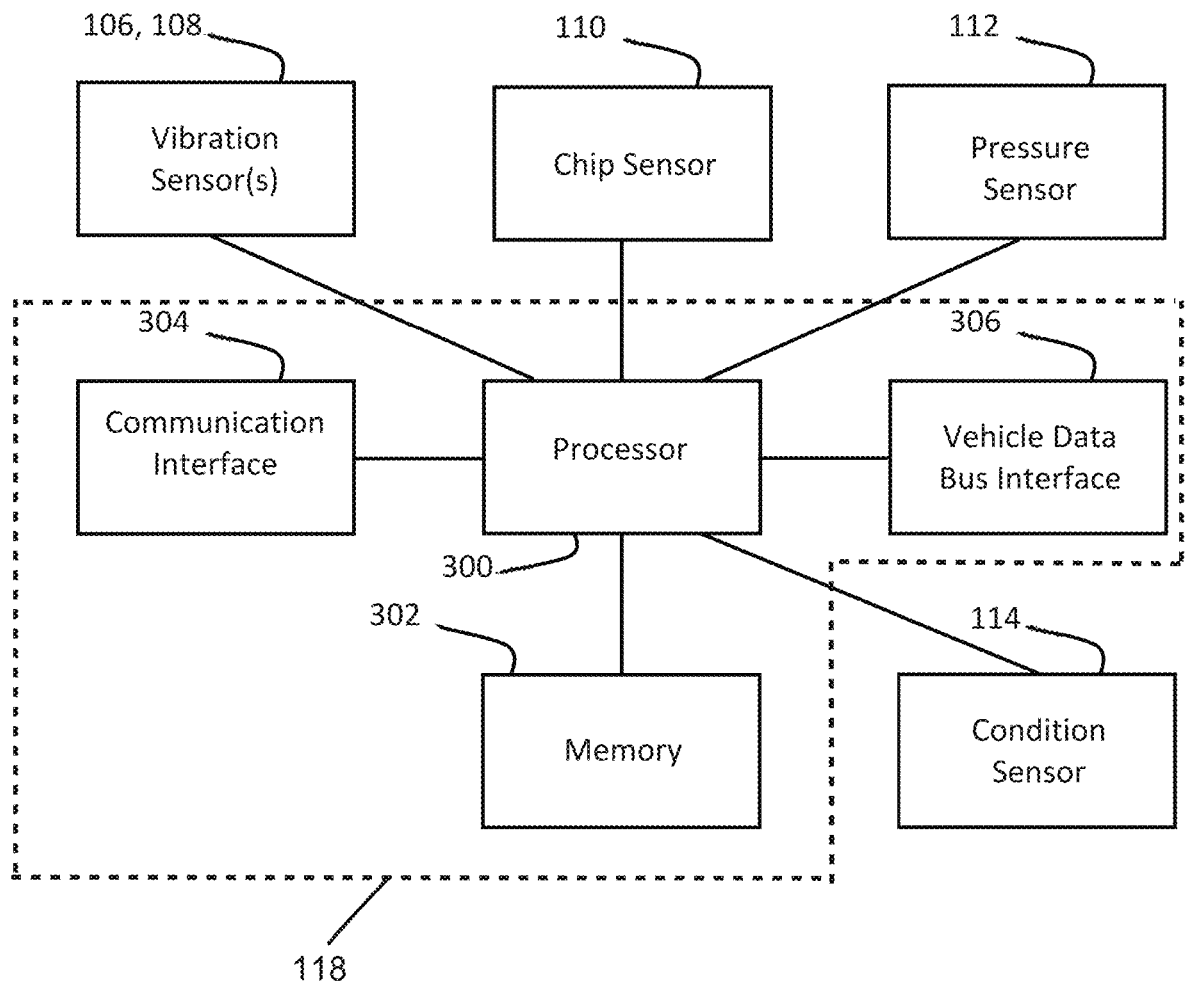
FIG. 3 is a functional block diagram of one embodiment of an edge processing unit and installed sensors, configured for using a neural network model to predict future mechanical failures of the hydrostatic transmission as shown in FIG. 2.

FIG. 3 is a functional block diagram of one embodiment of edge processing unit 118, comprising processor 300, memory 302, communication interface 304, vibration sensor(s) 106 and 108, chip sensor 110, pressure sensor 112, fluid condition sensor 114 and optional vehicle data bus interface 306. Edge processing unit 118 is a rugged, custom computer configured to process signals from the sensors using a neural network model trained to predict future mechanical failures of hydrostatic transmission 104, and to alert users when a potential mechanical failure may soon occur.

Processor 300 is configured to provide general operation of edge processing unit 118 by executing processor-executable instructions stored in memory 302, for example, executable computer code. The executable code may comprise an algorithm for predicting when future mechanical failures in the form of a specifically-rained neural network model. Processor 300 typically comprises one or more general or specialized microprocessors, microcontrollers, SoC's, and/or customized ASICs, selected based on computational speed, cost, and other factors. In one embodiment, processor 300 comprises one of Nvidia's Jetson processor line, for example, a low-cost Nano Orin. This credit-card sized module is a Linux-based processor that supports the industry-standard Nvidia Deepstream AI toolchain.

Memory 302 is coupled to processor 300 and comprises one or more non-transitory information storage devices, such as static and/or dynamic RAM, ROM, flash memory, or some other type of electronic, optical, or mechanical memory device. Memory 302 is used to store processor-executable instructions for operation of hydrostatic transmission 104, as well as other information, such as threshold information, identification information associated with hydrostatic transmission 104, vehicle 102 or edge processing unit 118. It should be understood that in some embodiments, a portion of memory 302 may be embedded into processor 300 and, further, that information storage device 302 excludes propagating signals.

Communication interface 304 is coupled to processor 300, comprising circuitry for sending information to wirelessly to personal communication device 120 or, in other embodiments, wirelessly via wide-area network 128 to application server 124 or to some other entity, including personal communication device 120. Preferably, communication interface 304 comprises circuitry necessary to wireless transmit and, in some embodiments receive, information to/from personal communication device 120 directly using a low-power transceiver, such as a Wi-Fi or Bluetooth, or other short-range communication, transceiver. In other embodiments, communication interface 304 may comprise a wired interface, comprising, for example, an ethernet port, USB port, etc. All of the above circuitry is well-known in the art.

Optional vehicle data bus interface 306 is coupled to processor 300, comprising circuitry used to communicate with a data bus of vehicle 102. Vehicle data bus interface 306 may be used in alternatively or in addition to communication interface 304 in embodiments where access to the vehicle data bus is readily available. The vehicle data bus may comprise a CAN bus, one or more twisted wire pairs, an OBD II bus, etc. In this embodiment, vehicle 102 may comprise a OEM user interface in a cockpit of vehicle 102 for displaying information regarding vehicle 102. The OEM user interface may be configured to display information from edge processing unit 118. Vehicle data bus interface 306 comprises circuitry well-known in the art.

Machine learning server(s) 126 are used to train neural network models to recognize the signs of wear and stress on hydrostatic drive 104 and to make predictions of when future mechanical failures may occur before they actually materialize. Machine learning server(s) 126 comprise one or more computers that retrieve large amounts of data related to hydrostatic drives from data lake 122 for training an initial neural network model. As the initial neural network model is trained, it becomes better at making accurate predictions. Once the neural network model performs to a predetermined expectation, it may be sent to edge processing unit 118 for execution on real-world signals from the various sensors of hydrostatic transmission 104 and/or other sensors associated with vehicle 102.

Data lake 122 may receive training data from a variety of sources, including vehicle 102 and other similar vehicles. The training data may comprise raw sensor data as well as metadata in the form of, for example, an identification of a particular hydrostatic transmission, edge processing unit, vehicle, vehicle engine and/or neural network model, including a make, model, serial number, model ID, model version number, an operating state of a vehicle, such as idling, forward, or reverse, an odometer reading at the time the raw sensor data was recorded, etc. In some embodiments, the metadata may comprise a maintenance state of a vehicle, such as one or more descriptions of maintenance previously performed on the vehicle, including dates that the maintenance was performed, an odometer reading when the service was performed, etc.

Data lake 122 receives the training data and may store it in accordance with modern database principles, for example, in a relational database. The training data may be stored in association with a vehicle make, model and/or serial number, a vehicle owner, etc., making it easier for data scientists operating machine learning server(s) 126 to request certain types of data for training purposes.

Storage of structured data files can be accomplished via the Amazon S3 service, which is simple to use and cost-effective. Likewise, automated archival and backup can be accomplished using the Amazon Glacier storage service.

For AI training runs, Extract-Transform-Load (ETL) pipelines may be developed by data scientists to identify and load relevant raw sensor data and metadata into an ephemeral database with a structure that is optimized for the particular training run being conducted.

Figure 4:
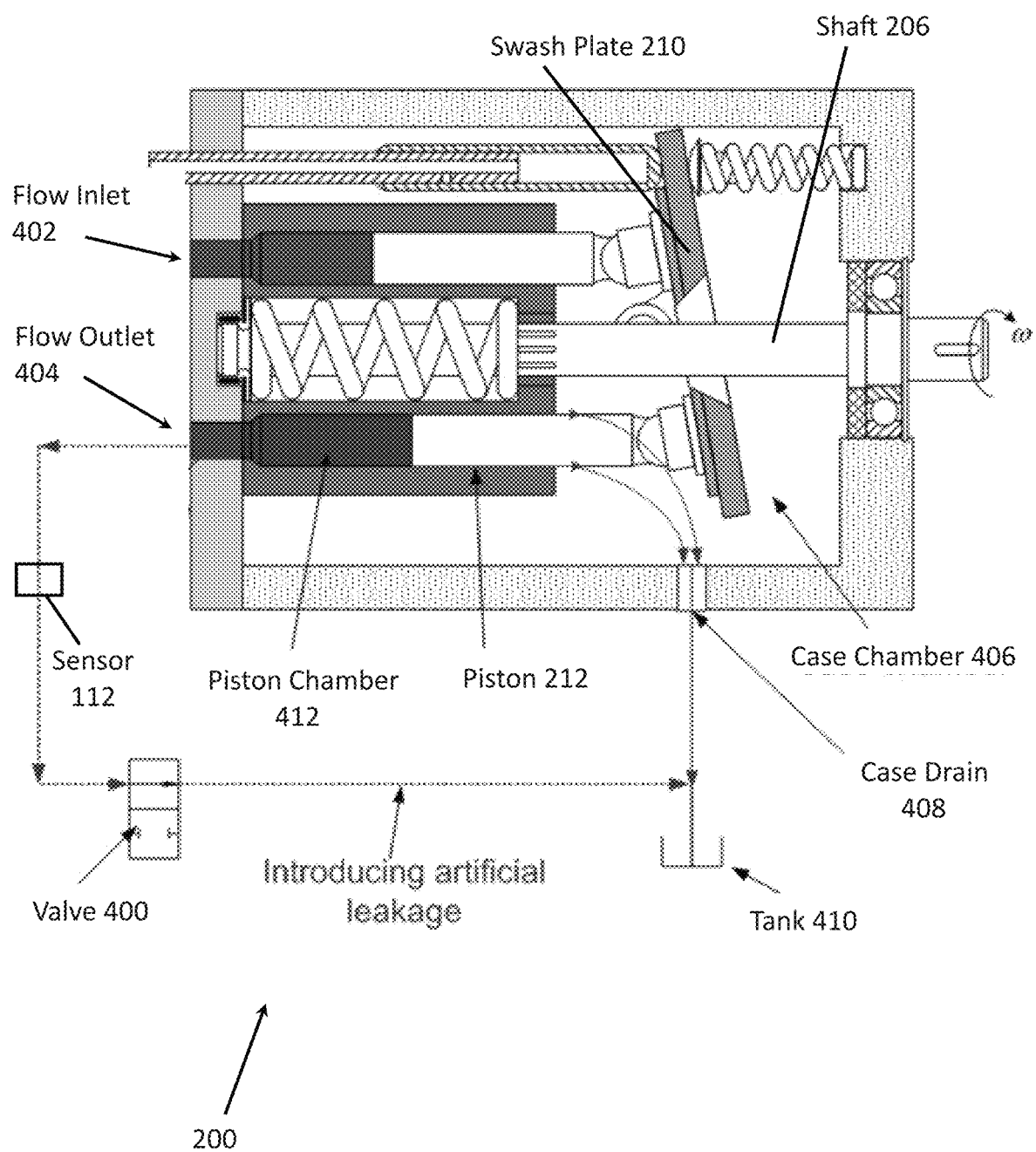
FIG. 4 is a side, cutaway view of one embodiment of an axial piston pump of the hydraulic transmission as shown in FIG. 1, configured to provide simulated training data with respect to piston wear.

Since it is generally helpful to receive training data before a mechanical failure occurs, and because mechanical failures may be rare, the training data may comprise simulated failure data. FIG. 4 is a side, cutaway view of one embodiment of axial piston pump 200, configured to provide simulated failure data to data lake 122 with respect to piston wear and, in some embodiments, to determine sensor types and locations for best detecting potential failures. It is desirable to be able to predict a plurality of failure modes using the axial piston pump 200 as configured in FIG. 4, such as contamination (environmental and component wear), transient pressure spikes, blocked pump inlets/hydraulic lines, pump case overpressure, etc. Destructive testing to induce these failure conditions would be prohibitively expensive, and would not generate the volume of training data necessary for machine learning. Therefore, test configurations like the one shown in FIG. 4 may be utilized to simulate fault conditions associated with each particular failure mode, and to determine sensor types and locations for best detecting potential failures.

Piston wear, and therefore leakage, occurs over time (typically years) with leakage flowing from case chamber 406 though case drain 408 and into tank 410. This process may be simulated using a high-frequency pressure control servo valve 400 to divert fluid from piston chamber 412, through pump outlet 402, with a prescribed waveform. Typically, the waveform causes pressure control servo valve 400 to pulse at a rotational speed of axial pump 200 such that the valve opens a pre-determined amount every time as a specific piston 212 is in a specific location, i.e., positioned over inlet ports and/or outlet ports of block 214. As the flow is being diverted, data from a variety of sensors (one of such sensors shown as pressure sensor 112) is stored by a simulation computer (not shown), recording raw data from each of the sensors. In one embodiment, different sets of sensors may be used each time a new simulation is performed to determine which sensor types, and their locations on hydrostatic transmission 104, are best suited to predict future maintenance issues. In another embodiment, where hydrostatic transmission 104 may comprise a number of preinstalled sensors, a variety of simulations may be performed, each time using sensors having different response characteristics, such as pressure sensitivity, frequency response, pressure range, etc., in order to determine which sensors are best at predicting future maintenance issues.

Simulations may be performed for each type of failure type mentioned above and for each failure type, sensor data may be collected over a range of operating conditions, such as fault severity, swashplate position, wheel torque, ambient temperature, etc.). For each simulation, the sensor data may be categorized, manually annotated with metadata and stored in data lake 122 and then used to train a neural network model for predicting future mechanical issues with hydrostatic drive 104. For example, raw sensor data may be annotated with metadata indicating one or more predetermined times before a simulated mechanical failure occurs during the simulation.

Figure 5:
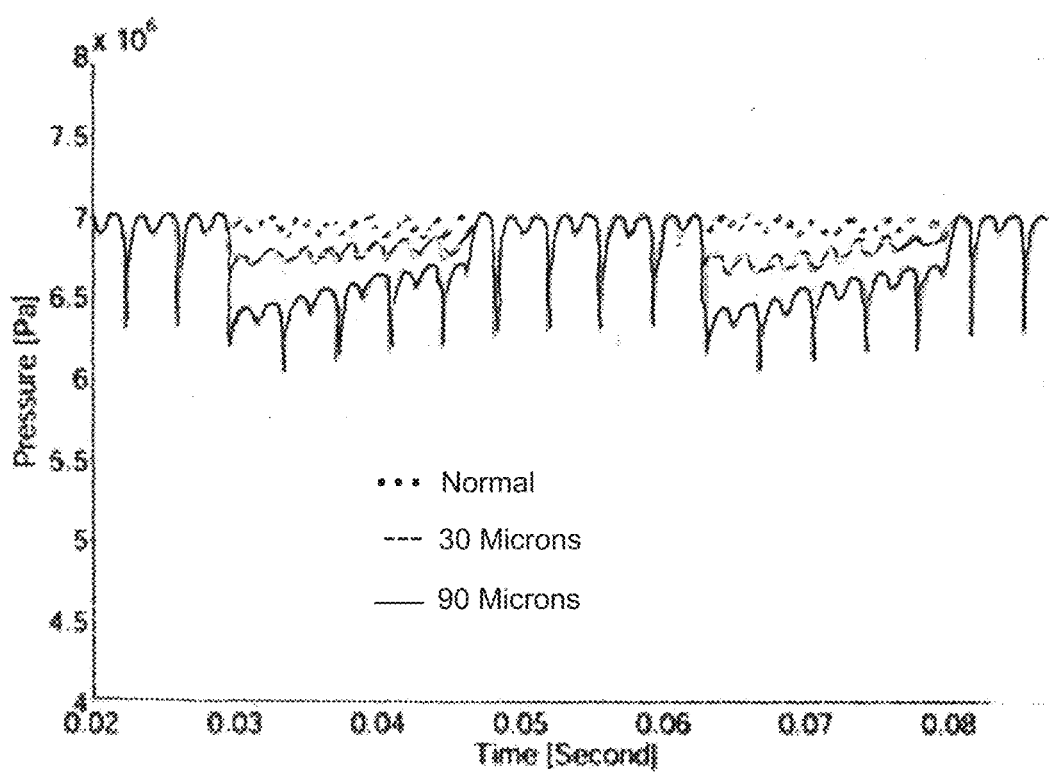
FIG. 5 is a graph of three waveforms superimposed on one another, showing the output of a pressure sensor as shown in FIGS. 2 and 3, as a fluid pressure of a piston chamber vs. time.

FIG. 5 is a graph of three waveforms superimposed on one another, showing the output of pressure sensor 112 as a fluid pressure of piston chamber 412 vs. time as fluid is diverted from piston chamber 412 via servo valve 400 using a high-frequency waveform, pulsing at a rate of about 300 cycles per second. As shown, in a piston having little or no wear, the pressure remains within a small pressure range during operation of pump 200. As wear in the piston increases to 60 microns, as simulated by pulsing fluid through valve 400 at a particular volume in association with the high-frequency waveform, the range of pressure changes increases while also introducing a "dip" in the waveform. When the wear of the piston increases to 90 microns, simulated by allowing a greater volume of fluid to pass through valve 400, the pressure changes of the fluid increase even more and the dip is more pronounced. When training a neural network model using such simulated data, one of the waveforms may be annotated to indicate that waveforms of this type typically occur prior to one or more particular mechanical failures of hydrostatic transmission 104, so that when the neural network model receives similar raw data from pressure sensor 112, hydrostatic transmission 104, it can infer that a future potential mechanical failure of hydrostatic transmission 104 may be imminent.

Figure 6:
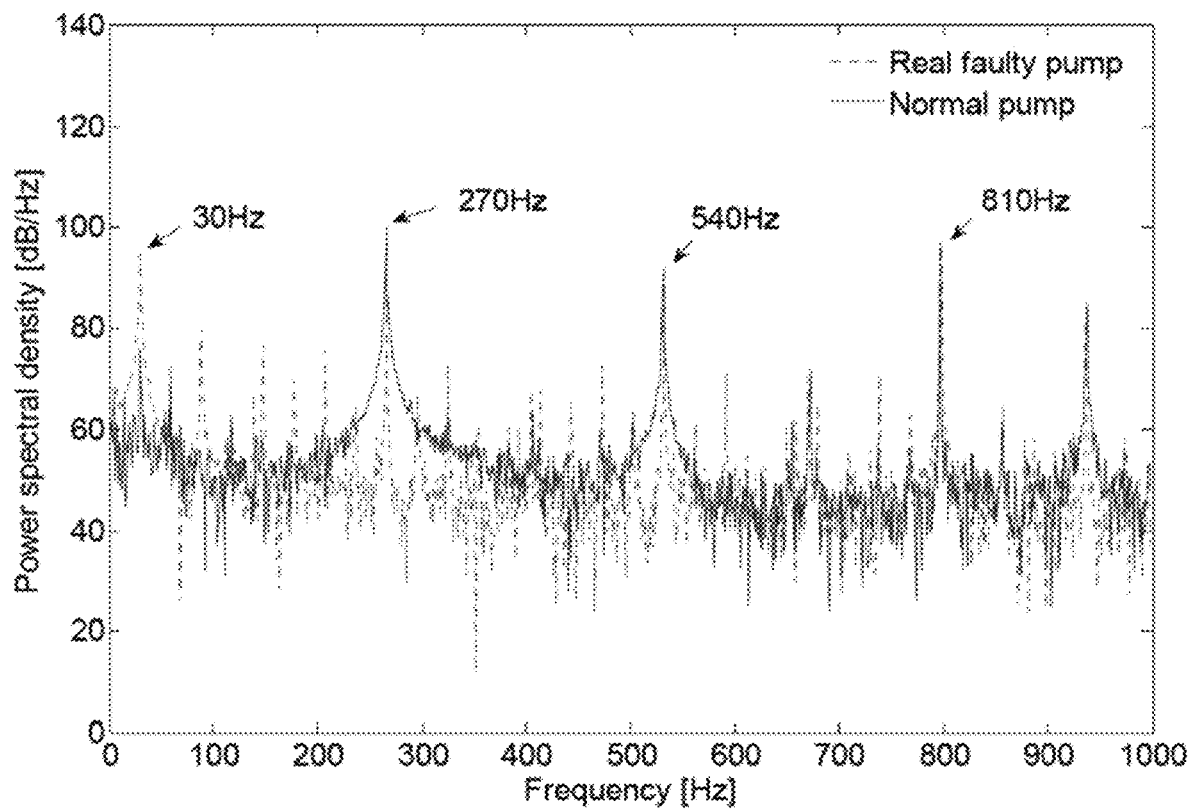
FIG. 6 is a graph of two waveforms superimposed on one another, one showing a simulated output of the pressure sensor as shown in FIGS. 2 and 3 in the frequency domain and the other an actual reading from another pressure sensor installed into an actual pump.

FIG. 6 is a graph of two waveforms superimposed on one another, one showing a simulated output of pressure sensor 112 in the frequency domain and the other an actual reading from another pressure sensor 112 installed into an actual pump 200. The output of both sensors are shown as a power spectral density vs. frequency, derived from signals from pressure sensors 112 in the time domain. As in the simulation described with respect to FIG. 6, fluid is diverted from piston chamber 412 via servo valve 400 using a high-frequency waveform. Both waveforms shown in FIG. 6 are similar, in that they have power density spikes 270 Hz, 540 Hz and 810 Hz. The one exception was at 30 Hz. In the faulty pump simulation, the peak magnitude at 30 Hz was 95 dB, compared to that of the normal pump at 75 dB. That means the 30 Hz frequency was more significant in the faulty pump than in the normal pump. This and other differences may be observed and used as training data to train the neural network model. In particular, the simulated output of pressure sensor 112 may be annotated to indicate that waveforms of this type typically occur prior to one or more particular mechanical failures of hydrostatic transmission 104, so that when the neural network model receives similar raw data from pressure sensor 112 on hydrostatic transmission 104, it can infer that a future potential mechanical failure of hydrostatic transmission 104 may be imminent.

Of course, similar simulations as described above, using time and frequency domain analysis could be used with respect to other sensor types, to simulate actual wear and failures of an actual hydrostatic transmission, and to use the simulated information as training data for the neural network model.

The neural network model may be trained numerous times using different sets of training data stored in data lake 122, derived from simulations or from actual raw sensor data from vehicles. In one embodiment, a neural network model may be trained using training data from a variety of simulated and/or real data from a variety of different vehicle makes and models to produce a general, trained neural network model, and then further train the general neural network model with training data particular to a make and model of a particular hydrostatic transmission 104 and/or vehicle 102 to produce a plurality of trained neural network models, each one trained for a specific make and/or model of hydrostatic transmission 104 and/or vehicle 102.

When a trained neural network model is deemed to accurately predict future mechanical failures, it may be uploaded over-the-air to an edge processing unit 118 associated with a particular hydrostatic transmission 104 and/or vehicle 102 over wide-area network 122, or using some other means, such as providing the trained neural network model on a memory stick, disc or other physical memory device. Edge processing unit 104 may then apply signals from sensors installed onto hydrostatic transmission 104 and/or vehicle 102 to the trained neural network model in order to predict future mechanical failures before they arise.

Figure 7A:
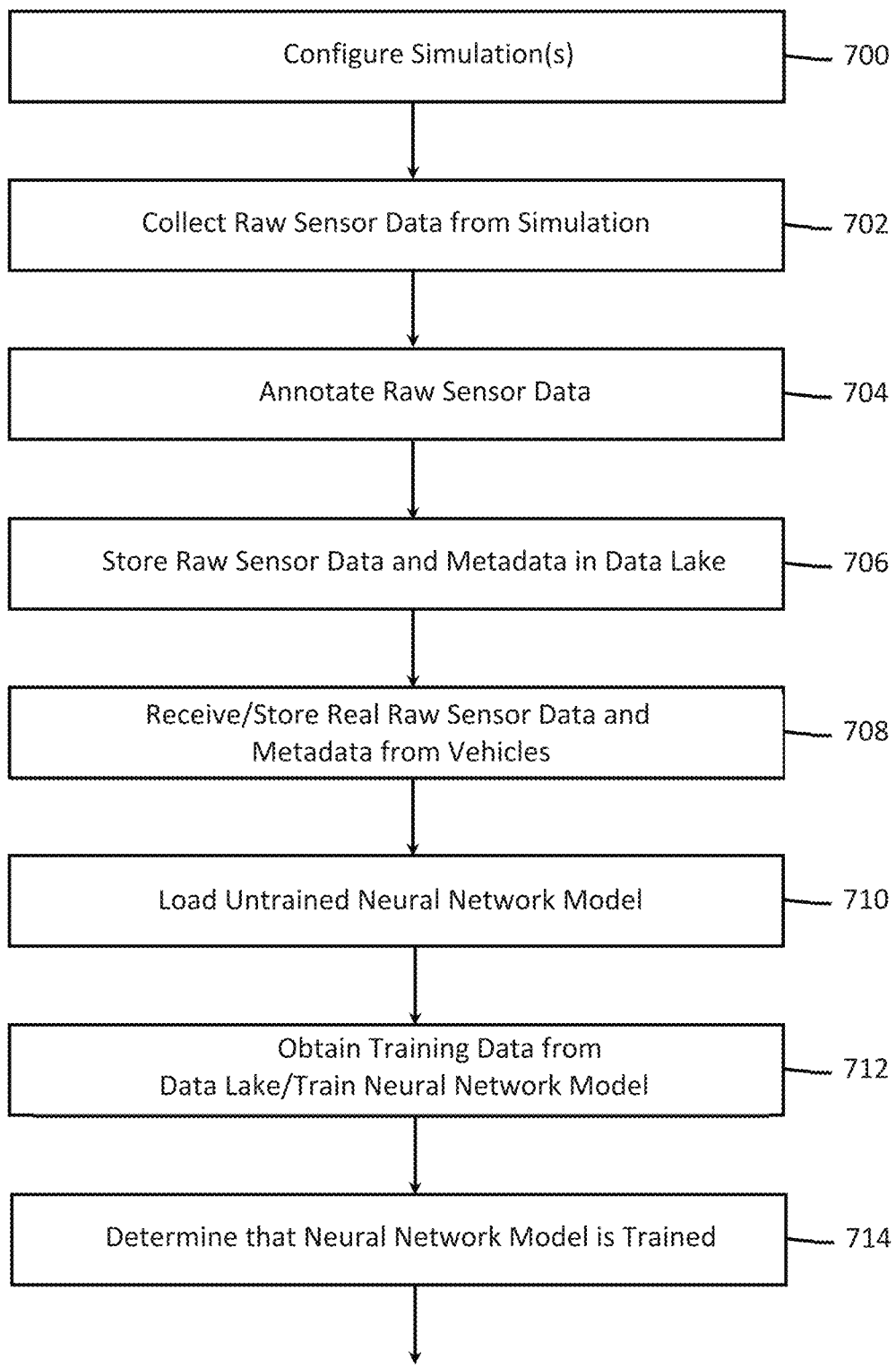
FIGS. 7A-7C represent a flow chart illustrating one embodiment of a method for predicting future mechanical failures of hydrostatic transmissions.
Figure 7B:
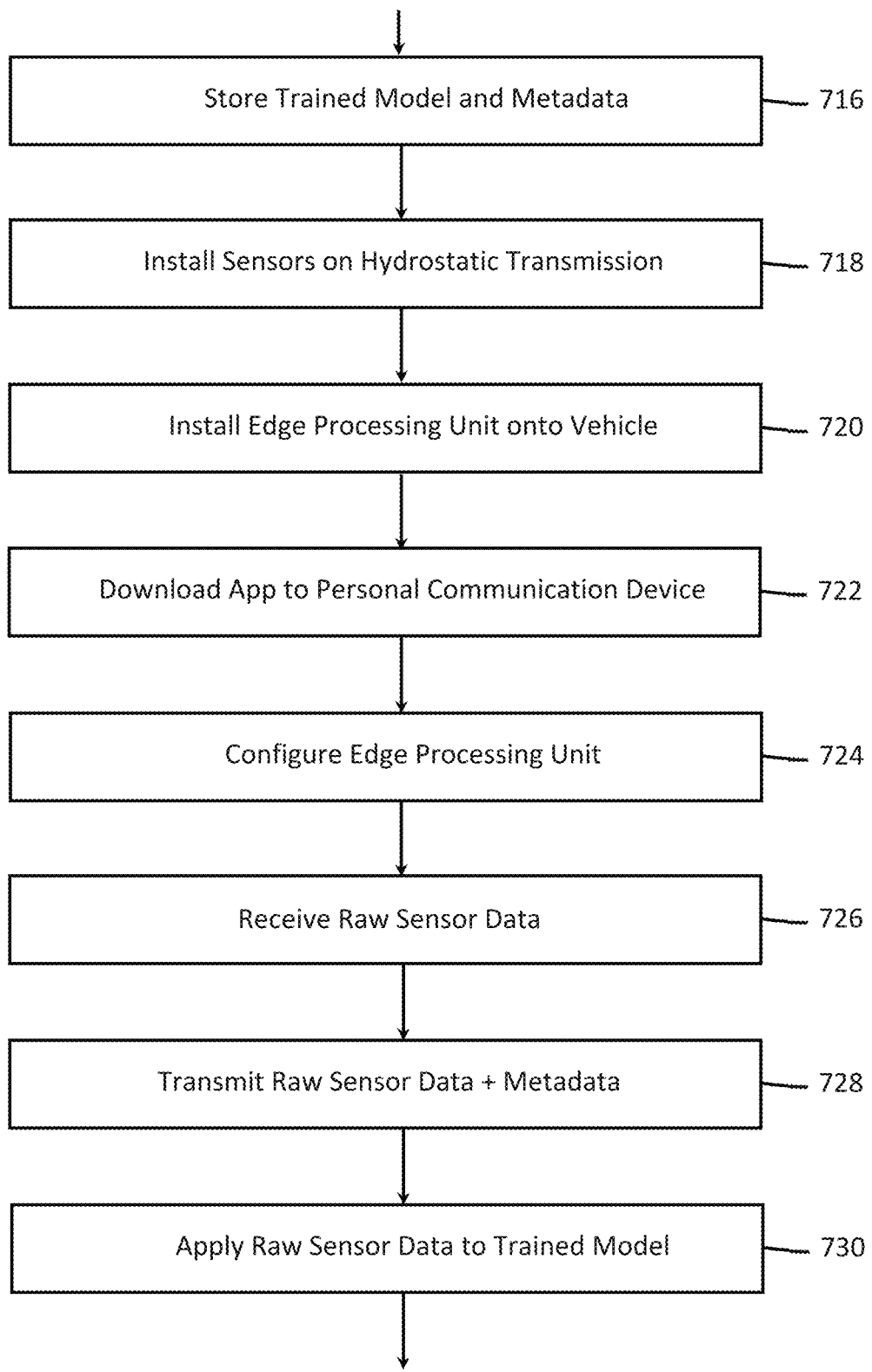
Figure 7C:
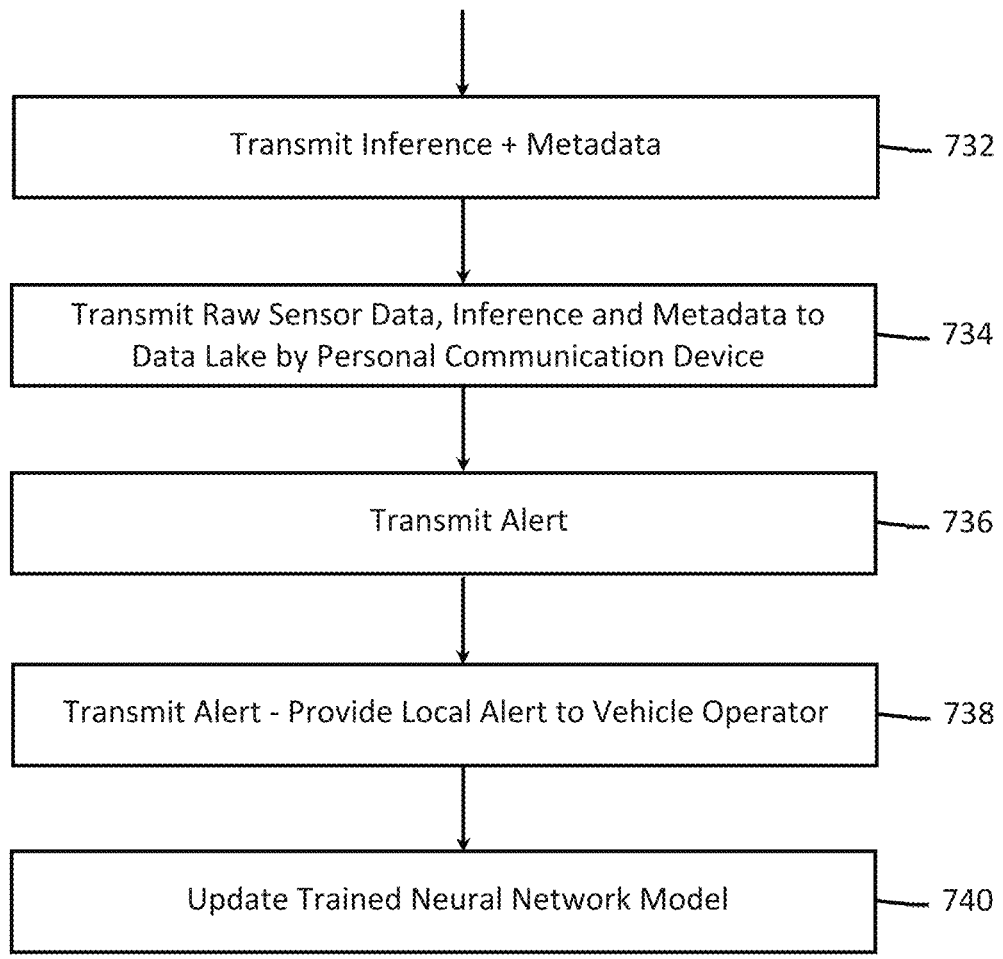

FIGS. 7A-7C represent a flow chart illustrating one embodiment of a method for predicting future mechanical failures of hydrostatic transmissions. It should be understood that in some embodiments, not all of the steps shown in FIGS. 7A-7C are performed, and that the order in which the steps are carried out may be different in other embodiments. It should be further understood that some minor method steps have been omitted for purposes of clarity.

At step 700, in one embodiment, one or more simulations are configured to obtain simulated failure data used as training data for a neural network model used to predict future mechanical failures of hydrostatic transmission 104, such as the simulation shown in FIG. 4. In some embodiments, a separate simulation is configured to obtain simulated training data based on a particular failure mode, such as one simulation to obtain simulated training data used to detect contamination of the fluid in hydrostatic transmission 104, another simulation to obtain simulated training data used to detect transient pressure spikes, yet another simulation to obtain training data used to detect blocked pump inlets/hydraulic lines, and still yet another simulation to obtain training data used to detect pump case overpressure. Of course, other similar simulations may be configured to detect other failure modes.

Configuration of a simulation generally comprises obtaining an actual hydrostatic transmission 104 and outfitting it with a plurality of different types of sensors. In some embodiments, a wide variety of actual hydrostatic transmissions are configured to provide particular simulated training data tailored to each particular hydrostatic transmission make and/or model. Alternatively, or additionally, a hydrostatic transmission 104 may already comprise sensors useful in obtaining simulated training data for different failure modes. Outputs from the sensors are fed to a simulation computer, where raw sensor data from the sensors is stored as the hydrostatic transmission 104 is operated in a manner to simulate conditions leading up to various failures. As examples, contaminants may be added to hydrostatic transmission 104 in order to obtain training data for a contamination failure mode, simulating blocked ports of hydraulic lines 204 to obtain training data for the blocked ports or hydraulic lines 204 failure mode, adding pressure to hydrostatic transmission 104 to obtain training data for the oil pressure failure mode, etc.

In some embodiments, simulated training data is obtained over a number of additional factors, such as simulating particular wheel torques, swashplate positions, ambient temperatures, etc.

At step 702, raw sensor data from the sensors is collected and stored in a simulation computer as each simulation is conducted.

At step 704, the raw sensor data may be annotated by a computer scientist operating the simulation in order to provide context and associate inferences with the raw sensor data in the form of metadata. The combination of simulated raw sensor data and metadata may be referred to herein as "simulated training data". For example, a computer scientist may annotate a set of raw sensor data after a simulation has concluded, indicating a make and/or a model of a particular hydrostatic transmission that provided the simulated training data, the conditions present while running the simulation, an indication of the number and types of sensors used during the simulation, and a state of the hydrostatic transmission associated with the raw sensor data. For example, a deviation of a power spectral density at a particular frequency may be annotated to indicate that a future mechanical failure is imminent.

At step 706, the raw simulated sensor data and associated metadata are typically stored in data lake 122 as simulated training data.

At step 708, data lake 122 may receive actual raw sensor data and metadata associated with a plurality of vehicles 102 in the field, respectively, over time, such as days, weeks, months and even years. The actual raw sensor data may comprise pressure readings, temperature readings, contamination readings, oil condition readings, temperatures, etc. The actual raw sensor data may be associated with metadata as well, such as a make, model or serial number of a particular vehicle 102, a type and installation location of each sensor, a make, model and/or serial number of a particular hydrostatic transmission 104, vehicle 102 information provided by sensor 116, indicating a vehicle's engine oil pressure, oil temperature, wheel torque, ambient air temperature, swashplate position, etc.

At step 710, a data scientist loads an untrained neural network model into machine learning server(s) 126.

At step 712, the data scientist begins training the untrained neural network model by obtaining either simulated training data and/or actual training data from data lake 122. The data scientist may define Extract-Transform-Load (ETL) pipelines to load relevant training data into an ephemeral database with a structure that is optimized for the particular training run being conducted. Training data may be selected based on a particular vehicle make and/or model, hydrostatic transmission make/or model, hydrostatic transmission type, vehicle 102, sensor configuration, etc. During training, internal parameters of the neural network model, known as weights, are adjusted in accordance with a machine learning algorithm. These weights may be initially random and are optimized through a process called backpropagation, where the neural network model learns to minimize the difference between predicted and actual outputs (loss function). The neural network model may utilize one of many learning algorithms found in the prior art, such as linear regression, decision trees, logistical regression, support vectors, Naive Bayes, etc. It should be understood that those skilled in the art could identify a particular neural network model and algorithm to use in order to process raw sensor data from the sensors installed onto hydrostatic transmission 104 in order to predict future mechanical failures.

Training the untrained neural network model may comprise many iterations of training, each iteration using different training data. In one embodiment, training comprises using training data from a variety of different hydrostatic transmission makes and/or models, vehicle makes and/or models and/or a variety of different sensor configurations, either obtained from simulations or actual vehicles to produce a generic, trained, neural network model that may be used in a number of different hydrostatic transmission types and/or vehicle makes and/or models. This model may then be further trained using particular training data from particular makes and/or models of hydrostatic transmission 104, vehicle 102 and/or different sensor arrangements, to produce a plurality of customized, trained neural network models, each tailored towards a particular hydrostatic transmission make and/or model, particular vehicle 102 type, and/or particular sensor arrangements.

At step 714, the data scientist may determine that the neural network model(s) has/have been sufficiently trained to detect at least potential future mechanical failures of hydrostatic transmission 104. The data scientist may annotate each trained neural network model with metadata to indicate a model ID, a model version, how each trained neural network model was trained, i.e., using actual or simulated training data, using particular makes and/or models of hydrostatic transmission 104, vehicle 102 and/or various sensor arrangements.

At step 716, the trained neural network model(s) and associated metadata is/are typically stored in data lake 122.

At step 718, a plurality of sensors may be installed onto a hydrostatic transmission 104 and/or vehicle 102 to provide actual raw sensor data associated with each sensor as vehicle 102 is operated. Alternatively, or in addition, hydrostatic transmission 104 and/or vehicle 102 may already comprise sensors installed by a manufacturer of hydrostatic transmission 104 and/or vehicle 102.

At step 720, edge processing unit 118 is installed onto vehicle 102 and coupled to each of the sensors.

At step 722, a vehicle operator may download an app to personal communication device 120 for communicating with edge processing unit 118, typically via a low-power, wireless communication interface, such as Wi-Fi or Bluetooth. Communications may comprise receiving alerts that a mechanical failure of hydrostatic transmission 104 may be imminent, for receiving raw sensor data and associated metadata for forwarding to data lake 122 and/or application server 124 via wide-area network 128, and for configuring edge processing unit 118. The app may additionally be used to download a particular, trained neural network model from data lake 122, either a generic version or one particularly suited to a particular hydrostatic transmission 104, vehicle 102 and/or a particular sensor arrangement. The app may then be used to load it processing unit 118 with the trained neural network. Download of the app may be initiated by the vehicle operator or via edge processing unit 118 after a communication link has been established between edge processing unit 118 and personal communication device 120.

At step 724, edge processing unit 118 is configured by the app running on personal communication device 120, as described above.

At step 726, vehicle 102 is operated over time, and edge processing unit 118 receives raw sensor data from the sensors installed into hydrostatic transmission 104 and/or vehicle 102. The raw sensor data may be stored in memory 302 by processor 300. In some embodiments, the raw sensor data is annotated with metadata, comprising information associated with the current neural network model, hydrostatic transmission 104 and/or vehicle 102. For example, the metadata may comprise the make and/or model of hydrostatic transmission 104 and/or vehicle 102, a current operating state of vehicle 102 (i.e., a direction of travel, i.e., forward or reverse, a speed of vehicle 102), engine oil pressure and temperature information, ambient air temperature, sensor configuration, a model number and version of the current neural network model, etc.

At step 728, the raw sensor data and any metadata may be transmitted by processor 300 via communication interface 304 to personal communication device 120 for forwarding by personal communication device 120 to a remote data center, such as data lake 122 and/or application server 124 for further training the neural network model and/or other neural network models.

At step 730, processor 300 applies the raw sensor data to the trained neural network model executed by processor 300 to produce inferences to alert the vehicle operator, and/or remote entities such as application server 124, of potential future mechanical failures of hydrostatic transmission 104. Inferences are produced by processor 300 executing the stored neural network model, and when the neural network model recognizes the raw sensor data as being similar to actual or simulated training data associated with a mechanical failure before the failure occurs, processor 300 may generate an alert so that catastrophic damage to hydrostatic transmission 104 and/or vehicle 102 can be avoided. For example, the neural network model may determine that an oil pressure of pressure sensor 112 substantially matches oil pressure training data as shown in FIG. 5 or FIG. 6, on which it was trained, and the neural network model may determine that a potential mechanical failure of hydrostatic transmission 104 is probable. Similarly, the neural network model may be trained to identify potential future mechanical failures of hydrostatic transmission 104 based on raw sensor data from other sensors after being trained by training data associated with each sensor type. It should be understood that inferences may be made using raw sensor data from a combination of two or more sensors.

Each inference may be annotated with metadata describing the conditions under which the inference was determined, such as an identification of the trained neural network model, a version number, a make and/or model of hydrostatic transmission 104 or vehicle 102, sensor configuration, date and time, etc. In one embodiment where edge processing unit 118 comprises vehicle data bus interface 306, processor 300 may receive a variety of OEM-generated operational information regarding vehicle 102, such as vehicle mileage, engine oil pressure, engine oil temperature, wheel torque, etc. some or all of this information may be added to inferences as additional metadata.

At step 732, processor 300 may transmit inferences, alerts and associated metadata to personal communication device 120 via communication interface 304.

At step 734, the inferences, alerts and metadata may be transmitted by personal communication device 120 to data lake 122 and/or application server 124 via wide-area network 128, where it may be used as training data to further train the neural network model of edge processing unit 118 or other neural network models.

At step 736, in one embodiment, processor 300 may provide alerts to a vehicle dashboard via vehicle data bus interface 306. In this embodiment, alerts may be sent to an OEM warning light, buzzer, or display of vehicle 102 via an OEM data bus of vehicle 102 for presentation to a vehicle operator. The vehicle operator, once alerted, may immediately cease operation of vehicle 102 in order to avoid catastrophic damage.

At step 738, upon receiving an alert from edge processing unit 118, indicating a potential future mechanical failure of hydrostatic transmission 104, personal communication device 120 may transmit the alert to a remote entity, such as data lake 122 or application server 124, for attention by trained personnel. Additionally, personal communication device 120 may generate an audible, visual and/or tactile alert, indicating to a vehicle operator that a potential future mechanical failure may be imminent.

At step 740, the trained neural network model stored in memory 302 may be updated upon initiation by application server 124, data lake 122 or by an operator of personal communication device 120 when an updated neural network model is available. Application server 124 or data lake 122 may automatically update the trained neural network model in memory 302 by transmitting the updated neural network model to personal communication device 120 via wide-area network 128. Personal communication device 120 may then forward the updated neural network model to edge processing unit 118. Alternatively, an operator of vehicle 102 may request an update and send the request to data lake 122 or application server 124. If an update is available, it is transmitted to personal communication device 120 via wide-area network 128 where it is received and, again, provided to edge processing unit 118 via short-range wireless communication. Processor 300, upon receipt of an updated neural network model, may replace the neural network model previously stored in memory 302 and use the updated neural network model thereafter to predict potential future mechanical failures of hydrostatic transmission 104.

In the description above, certain aspects and embodiments of the invention may be applied independently and some of them may be applied in combination as would be apparent to those of skill in the art. For the purposes of explanation, specific details are set forth in order to provide a thorough understanding of embodiments of the invention.

The above description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the embodiments as set forth in the appended claims.

Although specific details are given to provide a thorough understanding of at least one embodiment, it will be understood by one of ordinary skill in the art that some of the embodiments may be practiced without disclosure of these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a method, a process or an algorithm performed by a processor, which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. The terms "computer-readable medium", "memory", "storage medium", and "information storage device" includes, but is not limited to, portable or non-portable electronic information storage devices, optical storage devices, and various other mediums capable of storing, containing, or carrying instruction(s) and/or data. These terms each may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, RAM, ROM, flash memory, solid state disk drives (SSD), etc. A computer-readable medium or the like may have stored thereon code and/or processor-executable instructions that may represent a method, algorithm, procedure, function, subprogram, program, routine, subroutine, or any combination of instructions, data structures, or program statements.

Furthermore, embodiments may be implemented by hardware, software, firmware, middleware, microcode, hardware description languages, or any combination thereof. When implemented in software, firmware, middleware or microcode, the program code, i.e., "processor-executable code", or code symbols to perform the necessary tasks (e.g., a computer-program product) may be stored in a computer-readable or machine-readable medium. A processor(s) may perform the necessary tasks.

What is claimed is:

1. A predictive maintenance system for detecting future mechanical failures of a hydrostatic transmission, comprising:
a plurality of sensors installed onto one or more areas of the hydrostatic transmission, configured to generate raw sensor data representative of a plurality of sensed mechanical conditions of the hydrostatic transmission, respectively; and
an edge processing unit coupled to the plurality of sensors and comprising a communication interface for transmitting information to a personal communication device, configured to:
receive the raw sensor data from the plurality of sensors;
process the raw sensor data using a neural network model specifically trained to predict future potential mechanical failures of the hydrostatic transmission, wherein the neural network model is trained prior to deployment in the field using actual raw sensor data from a plurality of vehicles in use, at least some of the plurality of vehicles comprising different hydrostatic transmission types, respectively, and refined using raw sensor data received from vehicles having a particular make and model of the vehicle;
generate an inference based on the raw sensor data; and
transmit an alert via the communication interface when the inference indicates that a future potential mechanical failure of the hydrostatic transmission may occur.

2. The predictive maintenance system of claim 1, where the edge processing unit is further configured to annotate the inference with metadata associated with the inference and to transmit the inference and the metadata to the personal communication device for forwarding to a remote data processing center for use in further training the neural network model.

3. The predictive maintenance system of claim 1, where the plurality of sensors are selected from the group consisting of a chip detector, a pressure sensor, an accelerometer and a fluid condition sensor.

4. The predictive maintenance system of claim 1, wherein the edge processing unit further comprises:
a vehicle data bus interface;
wherein the edge processing unit is further configured to:
receive, via a vehicle data bus interface, OEM-generated operating information of the vehicle from the vehicle data bus interface as the vehicle is operated; and
send the inference, the raw sensor data and the OEM-generated operational information to the personal communication device for forwarding to a remote data processing center for use in further training the neural network model.

5. The predictive maintenance system of claim 4, wherein the OEM-generated operational information is selected from the group consisting of a swashplate position, a wheel torque, and an oil temperature.

6. The predictive maintenance system of claim 1, wherein the neural network model is first trained using training data from a simulation model, and then trained using the actual raw sensor data from the plurality of vehicles in use.

7. The predictive maintenance system of claim 1, wherein the plurality of sensors comprises a pressure sensor for detecting a pressure of hydrostatic fluid in the hydrostatic transmission, the pressure sensor mounted to a hydraulic line of the hydrostatic transmission.

8. The predictive maintenance system of claim 1, wherein processing the raw sensor data using the neural network model comprises:
determining that the raw sensor data substantially matches simulated training data used in a training run of the neural network model, the raw sensor data indicating an imminent mechanical failure of the hydrostatic drive.

9. The predictive maintenance system of claim 1, wherein the plurality of sensors comprises:
a first oil pressure sensor mounted to a first hydraulic line of the hydrostatic transmission;
a second oil pressure sensor mounted to a second hydraulic line of the hydrostatic transmission;
a first vibration sensor mounted to a case of the pump; and
a second vibration sensor mounted to a case of a hydraulic motor of the hydrostatic transmission;
wherein the edge processing unit is configured to determine the inference by applying the raw sensor data produced by the first oil pressure sensor, the second oil pressure sensor, the first vibration sensor and the second vibration sensor to the neural network model.

10. A method for predicting future mechanical failures of a hydrostatic transmission of a vehicle, comprising:
training a neural network model to detect anomalies in one or more physical operating characteristics of the hydrostatic transmission;
loading the trained neural network model onto an edge processing unit co-located with the vehicle;
receiving, by the edge processing unit, raw sensor data from a plurality of sensors mounted to the hydrostatic drive;
determining an inference by the neural network model based on evaluating the raw sensor data, wherein the inference indicates a potential future mechanical failure of the hydrostatic transmission, wherein the neural network model is trained prior to deployment in the field using actual raw sensor data from a plurality of vehicles in use, at least some of the plurality of vehicles comprising different hydrostatic transmission types, respectively, and refined using a specific raw sensor data received from vehicles having a particular make and model of the vehicle; and
sending, by the edge computing device, an alert of the inference to a personal communication device associated with the vehicle.

11. The method of claim 10, further comprising:
annotating the inference with metadata associated with the inference; and
sending the inference and the metadata to the personal communication device for forwarding to a remote data processing center for use in further training the neural network model.

12. The method of claim 10, where the plurality of sensors are selected from the group consisting of a chip detector, a pressure sensor, an accelerometer and a fluid condition sensor.

13. The method of claim 10, further comprising:
receiving, by the edge processing unit, OEM-generated operational information of the vehicle from a vehicle data bus interface; and
sending the inference, the raw sensor data and the OEM-generated operational information to the personal communication device for forwarding to a remote data processing center for use in further training the neural network model.

14. The method of claim 13, wherein the OEM-generated operational information is selected from the group consisting of a swashplate position, a wheel torque, and an oil temperature.

15. The method of claim 10, wherein the neural network model is first trained using training data from a simulation model, and then trained using the actual raw sensor data from the plurality of vehicles in use.

16. The method of claim 10, wherein the plurality of sensors comprises a pressure sensor for monitoring a pressure of hydrostatic fluid in the hydrostatic transmission, the method further comprising:
determining the inference based on the pressure of the hydrostatic fluid.

17. The method of claim 10, wherein processing the raw sensor data using the neural network model comprises:
determining that the raw sensor data substantially matches simulated training data used in a training run of the neural network model, the raw sensor data indicating an imminent mechanical failure of the hydrostatic drive.

18. The method of claim 10, wherein the plurality of sensors comprises:
a first oil pressure sensor mounted to a first hydraulic line of the hydrostatic transmission;
a second oil pressure sensor mounted to a second hydraulic line of the hydrostatic transmission;
a first vibration sensor mounted to a case of the pump; and
a second vibration sensor mounted to a case of a hydraulic motor of the hydrostatic transmission;
wherein determine the inference comprises applying the raw sensor data produced by the first oil pressure sensor, the second oil pressure sensor, the first vibration sensor and the second vibration sensor to the neural network model.

* * * * *